Figure 1:
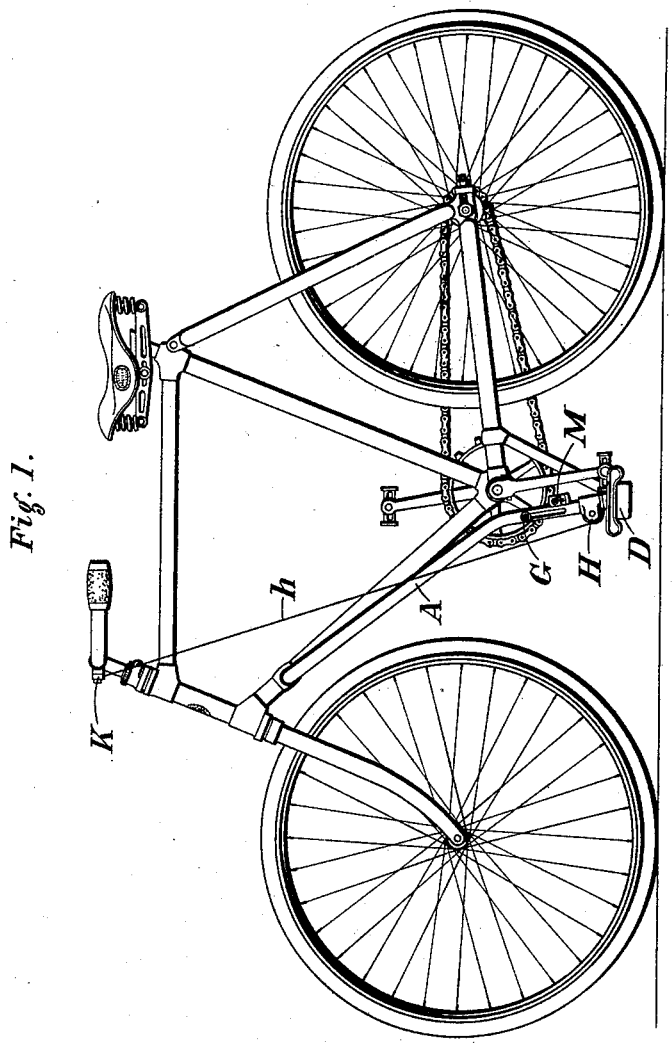

No. 613,165. Patented Oct. 25, 1898.
W. B. MARLING.
BICYCLE BRAKE.
(Application filed Dec. 20, 1897.)

(No Model.) 4 Sheets—Sheet 1.

No. 613,165. Patented Oct. 25, 1898.
W. B. MARLING.
BICYCLE BRAKE.
(Application filed Dec. 20, 1897.)
(No Model.) 4 Sheets—Sheet 2.
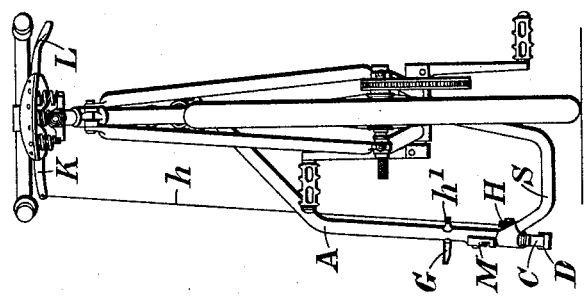
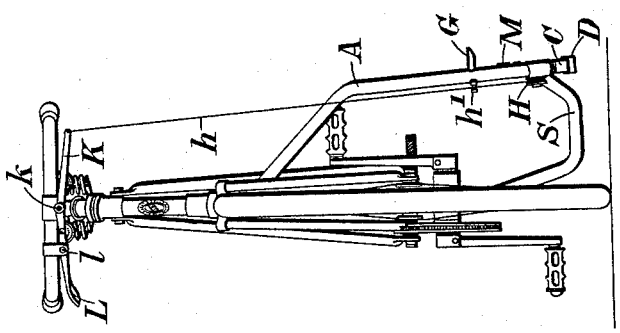

No. 613,165. Patented Oct. 25, 1898.
W. B. MARLING.
BICYCLE BRAKE.
(Application filed Dec. 20, 1897.)
(No Model.) 4 Sheets—Sheet 3.
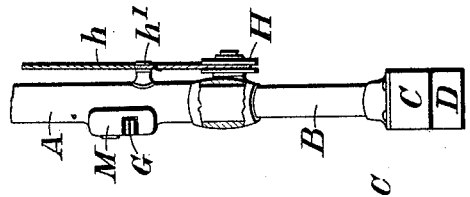
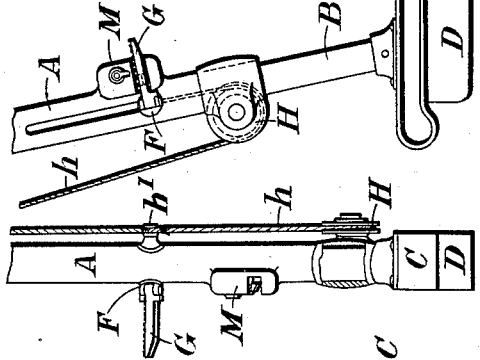
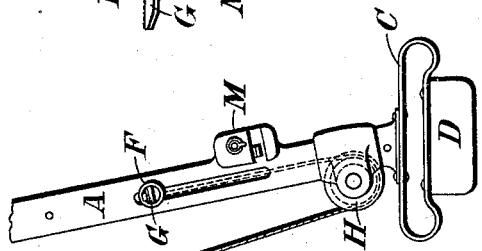
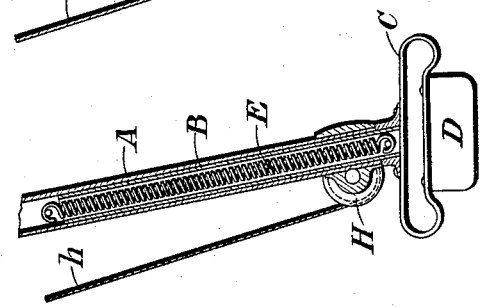
Witnesses
Inventor
Walter B. Marling
By James L. Norris
Atty No. 613,165. Patented Oct. 25, 1898.
W. B. MARLING.
BICYCLE BRAKE.
(Application filed Dec. 20, 1897.)
(No Model.) 4 Sheets—Sheet 4.
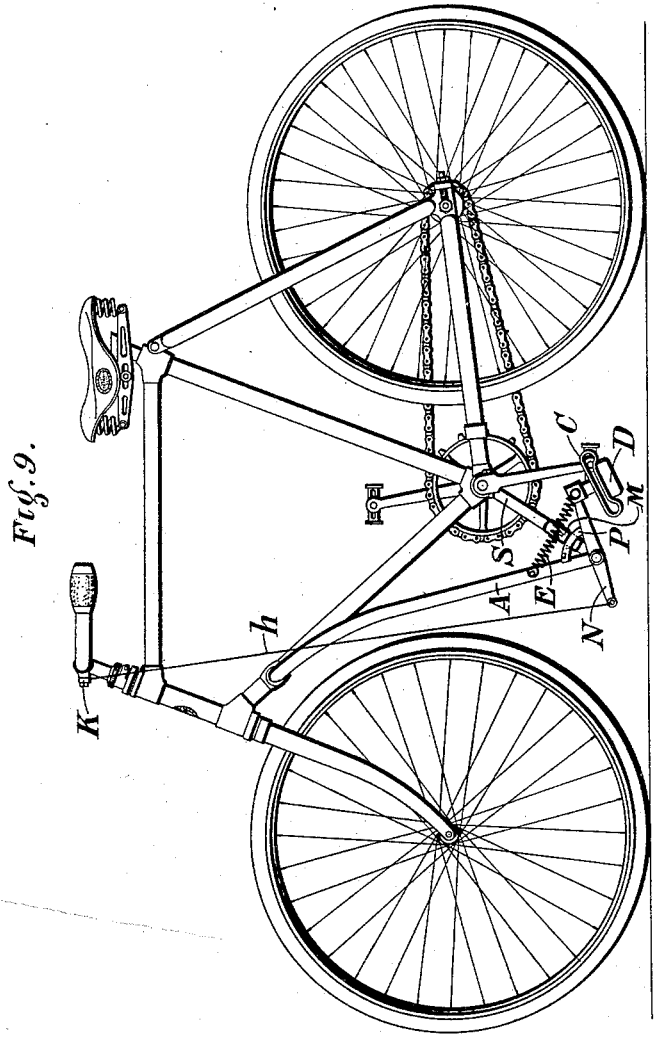

UNITED STATES PATENT OFFICE.

WALTER B. MARLING, OF SYDNEY, ENGLAND.

BICYCLE-BRAKE.

SPECIFICATION forming part of Letters Patent No. 613,165, dated October 25, 1898.

Application filed December 20, 1897. Serial No. 662,652. (No model.)

*To all whom it may concern:*

Be it known that I, WALTER BENTLEY MARLING, a citizen of England, residing at Clanna, Sydney, in the county of Gloucester, England, have invented a certain new and useful Improved Brake for Bicycles, of which the following is a specification.

A brake for a bicycle is usually arranged so as to act on the tire of the wheel, often damaging it, and when it is applied to a pneumatic tire the brake is often rendered useless by the collapse of the tire.

My invention relates to means of braking a bicycle by causing the brake to act directly on the ground, and the appliance for this purpose is so arranged that it can be made to form a foot for the bicycle, thus giving it stability when it is at rest or when the rider is mounting. For this purpose I apply a brake to a bicycle as I shall describe, referring to the accompanying drawings.

Figure 1 is a side view, Fig. 2 is a front view, and Fig. 3 is a rear view, of a bicycle having applied to it a brake according to my invention. Fig. 4 is a vertical section, Fig. 5 is a side view, and Fig. 6 a rear view, of the lower part of the frame for carrying the brake. Fig. 7 is a side view, and Fig. 8 is a rear view, of the same with the brake depressed. Fig. 9 is a side view showing a modification.

Similar reference-letters are employed to denote corresponding parts in the several figures.

To the frame of the bicycle I attach a bent tube A, steadied by a stay-tube S. The lower part of A is straight and has fitted to slide within it a tube B, to the lower end of which is attached a spring C and brake-block D. A helical spring E has its upper end attached to a pin on the outer tube A and its lower end attached to a pin on the inner tube B, this spring drawing up the brake except when it is forcibly depressed. To one side of the inner tube B is attached a stud F, which projects through and can move along a slot in the side of the outer tube A, and to this stud is hinged a foot-rest G, which can turn on the hinge in an approximately horizontal plane. At the lower end of the tube A is mounted a pulley H, around which passes a cord $h$, having its one end attached to a pin $h'$ on the outer tube A and its other end attached to one arm of a brake-lever K, which is fulcrumed on the frame at $k$, and has its other arm freely jointed to the short arm of the hand-lever L, which is fulcrumed on the frame at $l$. On pressing the lever L toward the steering-bar, thereby drawing up the cord $h$, or on pressing down the foot-rest G the brake-block D is pressed upon the ground, and on releasing the lever L or releasing the pressure on the foot-rest G the spring E draws up the brake-block.

When the brake is depressed, as shown in Figs. 7 and 8, the foot-rest G can be turned on its hinge and inserted in the slot of a lock M, which is fixed on the tube A. In this position the foot-rest can be locked, the brake-blocks being thus held down upon the ground, forming a foot for the bicycle and preventing it from being easily removed by a person who has not a key for the lock M.

As shown in Fig. 9, a lever N, fulcrumed on the lower end of the tube A, carries the brake-block D, which is held up by the spring E and may be depressed by the foot or by the hand brake-lever, raising the cord $h$, attached to the lever N. To this lever is attached a segment P, which works through the slot of a lock M, by which the brake can be locked in its depressed position.

Having thus described the nature of this invention and the best means I know of carrying the same into practical effect, I claim—

1. In a bicycle, the combination with the frame of a laterally and downwardly extended tube, a spring-raised inner tube carrying a brake-block, a lock upon the outer tube, and a foot-rest hinged to a stud which projects through a slot in the outer tube, said foot-rest being adapted to engage said lock when depressed, substantially as described.

2. In a bicycle, the combination with the frame of a downwardly and laterally extending tube, an inner tube normally raised by a spring and carrying a brake-block on its lower end, the latter tube having a stud projecting through a slot in the outer tube, a brake-lever fulcrumed on the frame and having one end connected by a cord to the said stud, a guide-pulley for the cord below the stud, a lock on the outer tube near the lower end of a slot in said tube and a foot-rest carried by a stud on the inner tube and adapted to turn and engage the lock when the lower end of the slot is reached, substantially as described.

3. In a bicycle, the combination with the frame of a tube arranged upon one side and extending downward, an inner, spring-raised tube at the lower end thereof carrying a brake-block, a brake-lever connected to a stud on the inner tube by a cord carried over a pulley below a slot in the outer tube through which the stud projects, a stud projecting from the inner tube and having a hinged foot-rest, and a lock on the outer tube near the lower end and on one side of a slot for said stud, the foot-rest being capable of engaging said lock, substantially as described.

In testimony whereof I have signed my name to this specification, in the presence of two subscribing witnesses, this 9th day of December, A. D. 1897.

WALTER B. MARLING.

Witnesses:
 MILTON HAINE,
 G. GREENE.